(12) United States Patent
Hung

(10) Patent No.: US 6,199,693 B1
(45) Date of Patent: Mar. 13, 2001

(54) RECEIVING BAG OF JACK

(75) Inventor: Michael Hung, Lu Chu Hsiang (TW)

(73) Assignee: Shinn Fu Corporation, Tao Yuan County (TW)

( * ) Notice: Subject to any disclaimer, the term of this patent is extended or adjusted under 35 U.S.C. 154(b) by 0 days.

(21) Appl. No.: 09/443,315

(22) Filed: Nov. 19, 1999

(51) Int. Cl.[7] ................................................. A45C 11/26
(52) U.S. Cl. ........................... 206/349; 206/372; 206/803
(58) Field of Search .................................. 206/349, 372, 206/373, 803; 190/102; 150/157, 161, 165

(56) References Cited

U.S. PATENT DOCUMENTS

| | | | |
|---|---|---|---|
| 702,403 | * | 6/1902 | Chapman .............................. 190/102 |
| 954,840 | * | 4/1910 | Wiedemann ........................ 190/102 |
| 3,483,954 | * | 12/1969 | Michalski ............................ 190/102 |
| 3,513,969 | * | 5/1970 | Roff ..................................... 206/372 |
| 4,301,898 | * | 11/1981 | Plough et al. ....................... 190/102 |
| 4,854,432 | * | 8/1989 | Carpenter et al. ................... 190/110 |
| 5,423,404 | * | 6/1995 | Shaw ................................... 206/372 |
| 5,947,286 | * | 9/1999 | Chau ................................... 206/372 |
| 5,971,101 | * | 10/1999 | Taggart ............................... 206/373 |
| 6,000,542 | * | 12/1999 | Smith .................................. 206/349 |

* cited by examiner

*Primary Examiner*—David T. Fidei
(74) *Attorney, Agent, or Firm*—Varndell & Varndell, PLLC

(57) ABSTRACT

A receiving bag of a jack for storing a car jack made of plastic or cloth. The receiving bag has an approximately rectangular shape. The top of the receiving bag has a zippered opening, and the inner bottom of the bag has a rectangular bottom plate. The front and rear edges of the bottom plate are provided with respective transversally long fixing plates. Two fixing means are installed at the proper positions at one side of the bottom plate. A jack is received within the receiving bag and the wheels of the jack abut the fixing plates on the bottom plate. Furthermore, the fixing means serve to fix the handle of the jack. Thereby, the user may store the jack conveniently within the receiving bag for a long time.

9 Claims, 5 Drawing Sheets

RECEIVING BAG OF JACK

FIELD OF THE INVENTION

The present invention relates to a receiving bag of a jack, which is made of plastics and cloth, and is convenient for receiving, carrying and storing a jack, moreover, the lifetime of the jack can be prolonged.

BACKGROUND OF THE INVENTION

The object of a conventional jack serves to lift heavy object. According to the object to be lifted and the working environment, the jacks can be classified into large jacks and small jacks. The small jacks are easily movable so as to compensate the defect of difficult transformation of large jacks. For example, a car usually carries a small jack for being used in emergency due to accidence during travelling. Therefore, a car using jack is extra placed in a car box.

However, the prior art car using jack is placed within the paper box. While the paper box is a fixed type box as the jack is taken out therefrom. Thus, it is not foldable as desired. Therefore, the space for operating the jack is occupied. Moreover, a paper box is easily to be destroyed. Usually, when the jack is not stored carefully, the paper box will be harmed by the jack. Even if it is not destroyed by the jack, the paper box can be damaged by action of water. Furthermore, the paper box for storing a jack in a car often has a rectangular shape with a smooth surface without proper points for applying a force. Therefore, when it is desired to remove the jack from the paper box, it is difficult to hold and pull the paper box.

SUMMARY OF THE INVENTION

Accordingly, the primary object of the present invention is to provide a receiving bag for storing and fixing a jack that is made of plastic or cloth. The receiving bag has approximately a rectangular shape. The top of the receiving bag has a zipper opening, and the inner bottom thereof is installed with a rectangular bottom plate. The front and rear edges of the bottom plate are installed with respective transversally long fixing plates. Two fixing means are installed at the proper positions at one side of the bottom plate. Thereby, the jack can be received within the receiving bag for being easily carried by the user and the lifetime of the receiving bag can be prolonged.

Another object of the present invention is to provide a receiving bag of a jack, wherein a tool bag can be further installed at the outer surface of the receiving bag for receiving handle tool. A layered bag can be stored in the receiving bag for placing other objects.

The various objects and advantages of the present invention will be more readily understood from the following detailed description when read in conjunction with the appended drawing.

DETAILED DESCRIPTION OF THE PREFERRED EMBODIMENTS

Figure 1:
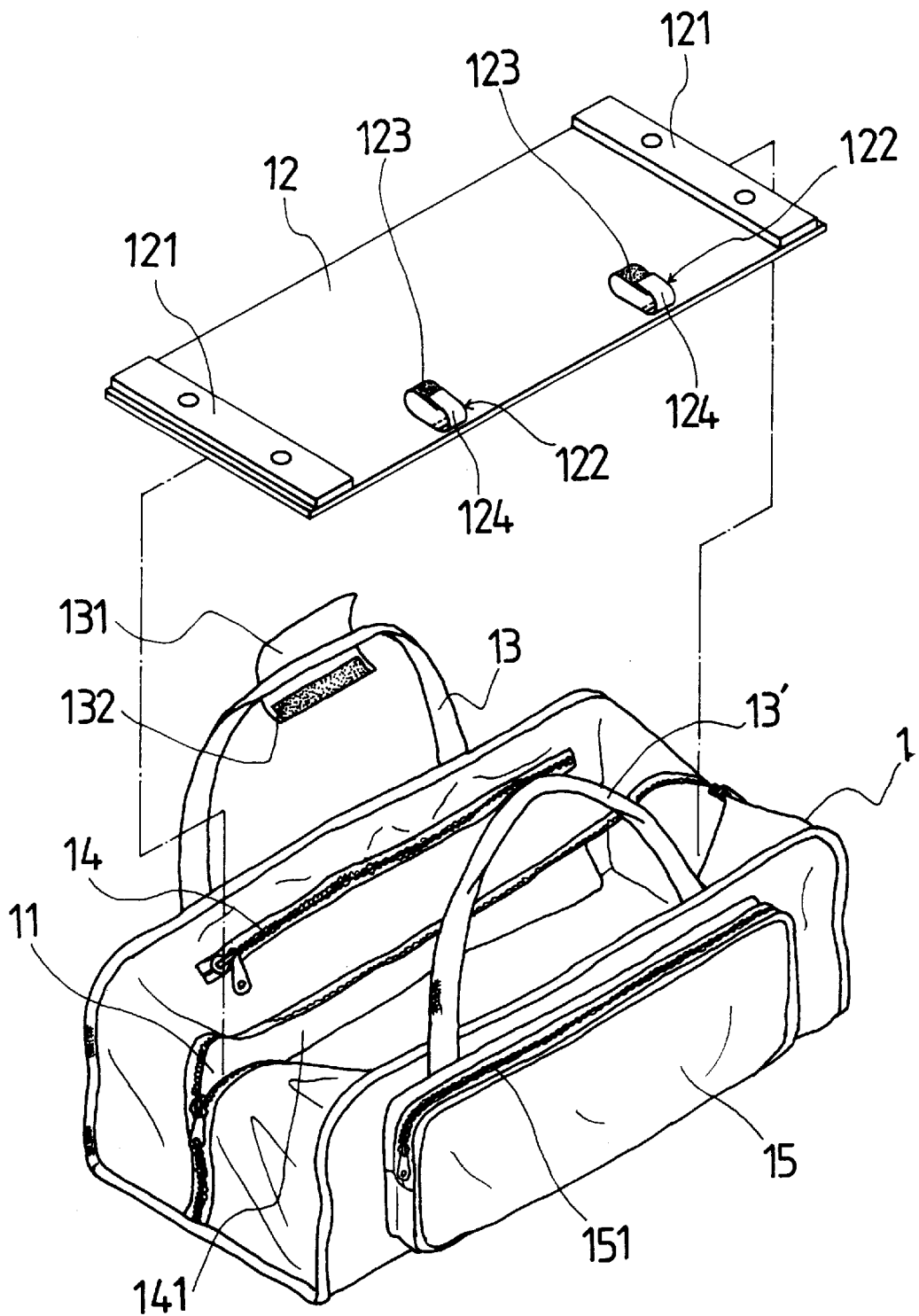
FIG. 1 is an exploded perspective view of the present invention.
Figure 2:
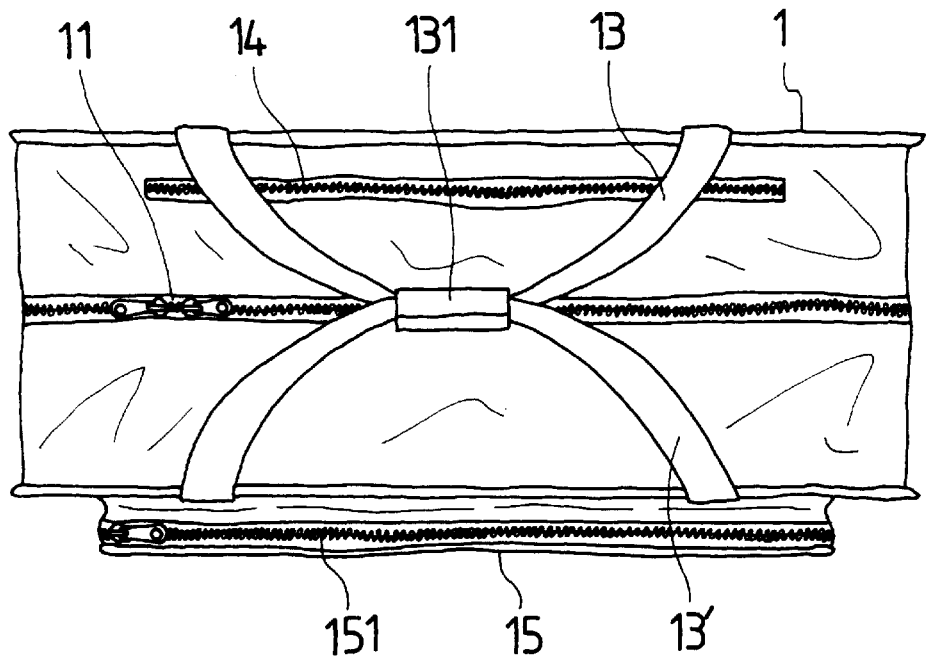
FIG. 2 is an elevation view of the present invention.
Figure 3:
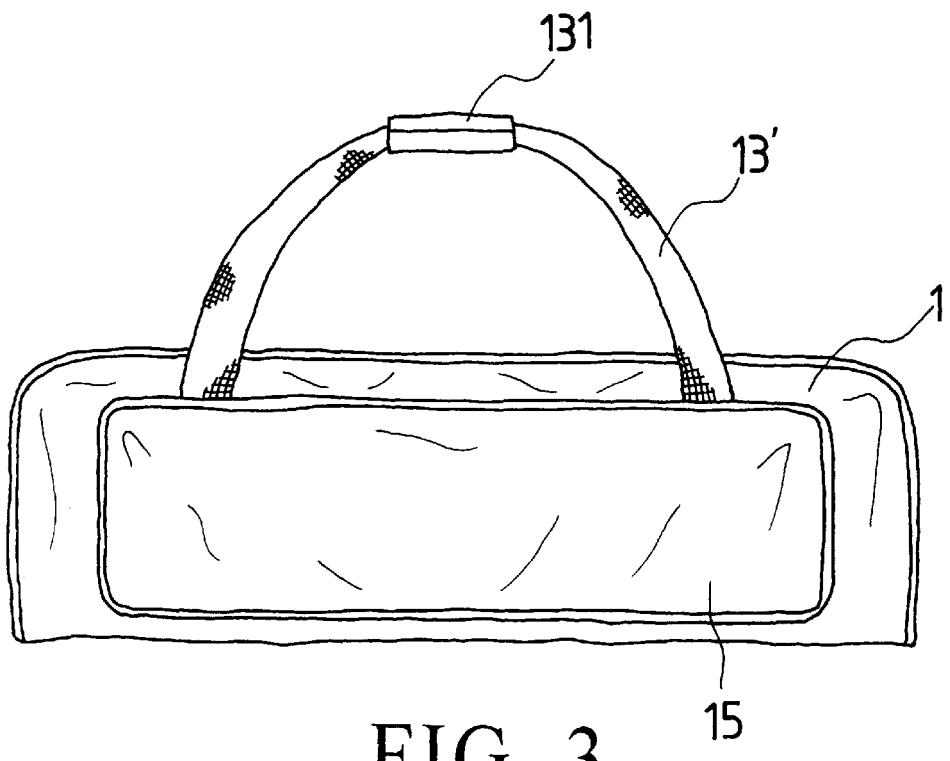
FIG. 3 is a lateral view of the present invention.

With reference to FIGS. 1~3, the receiving bag of a jack according to the present invention is illustrated. The receiving bag 1 serves to receive a jack therewithin and is made of plastics or cloth.

Figure 4:
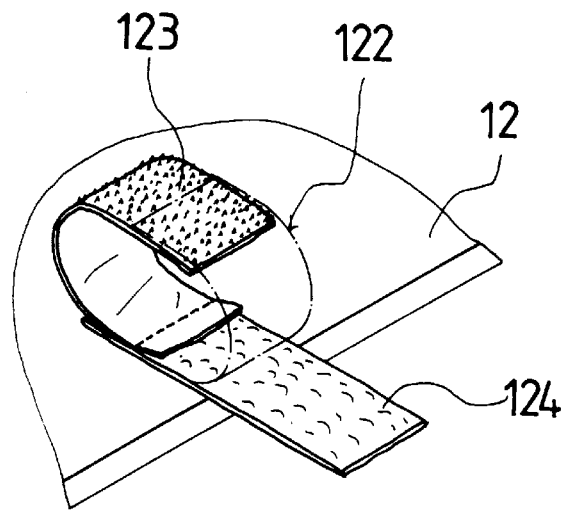
FIG. 4 is a schematic perspective view of the fixing means according to the present invention.
Figure 5:
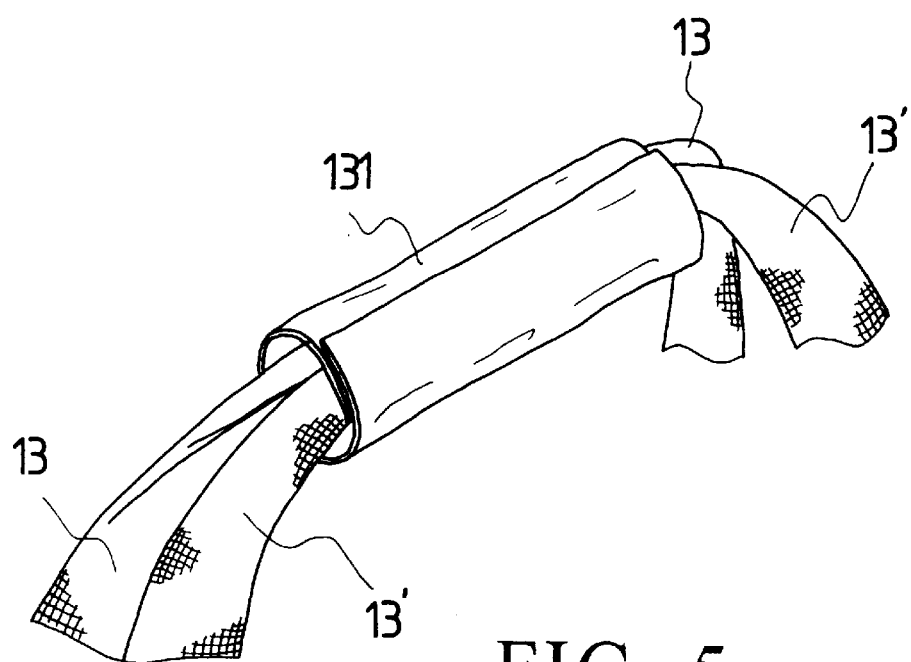
FIG. 5 is a schematic perspective view showing the embodiment of the pad in the present invention.

The receiving bag 1 (as shown in FIG. 1), is a bag approximately having a rectangular shape. A central top thereof is installed with a zipper opening 11 extending to the front and rear ends of the receiving bag 1. The inner bottom of the receiving bag 1 is installed with a rectangular bottom plate 12. The tops of the front and rear ends of the bottom plate 121 are transversally firmly secured with a long fixing plate 121. One side of the top of the bottom plate 12 is installed with one or more fixing means 122 which is encircled by a male sticky buckle 123 and a female sticky buckle 124. One end of the male sticky buckle 123 is overlapped with one end of the female sticky buckle 124, and the overlapped portion is firmly secured to the top of the bottom plate 12. The other ends of the buckles 123 and 124 are capable of being torn away or connected by their sticky property (as shown in FIG. 4). Two outer sides of the receiving bag 1 are provided with handle portions 13 and 13'. A pad 131 with an opening facing outwards is installed at the middle of one handle portion 13. The pad 131 has a sticky buckle 132 for combining the two handle portions 13 and 13' (as shown in FIG. 5). One side of the top of the receiving bag 1 is provided with a zippered opening 14. The zippered opening 14 communicates with a layered bag 141 positioned within the receiving bag 1. One outside of the receiving bag 1 has a protruding tool bag 15 of an approximately rectangular shape. The top edge of the tool bag 15 has a zippered opening 151. Thereby, the receiving bag of a jack according to the present invention is constructed.

Figure 6:
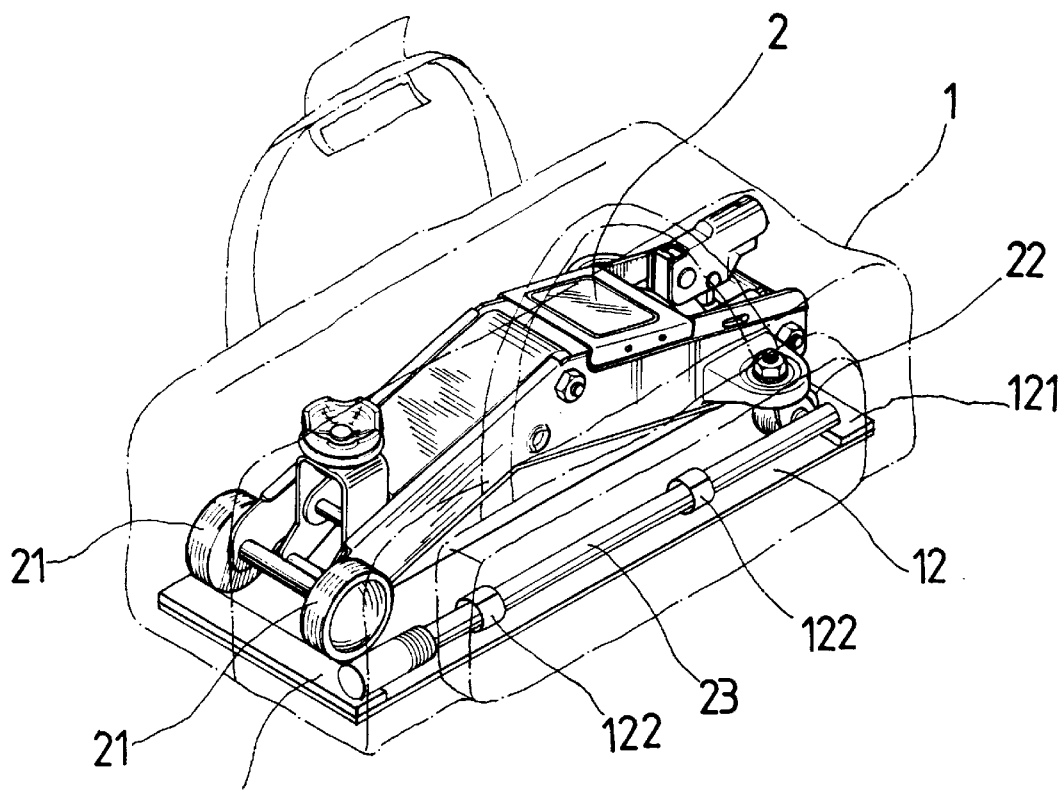
FIG. 6 is a perspective view showing one embodiment of the present invention.
Figure 7:
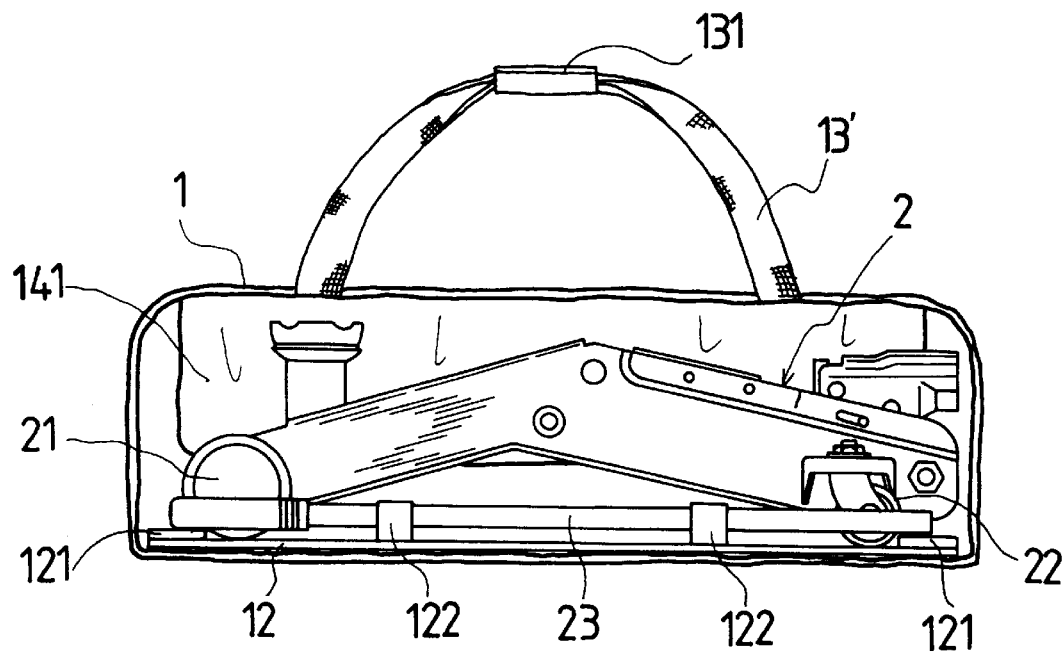
FIG. 7 is a lateral cross sectional view of the embodiment according to the present invention.

The design of the receiving bag according to the present invention provides a device for receiving and carrying a carjack in an easy and convenient manner (as shown in FIGS. 6 and 7). The jack 2 can be placed into the receiving bag 1 from the zippered opening 11 at the top surface thereof. The front wheel 21 and rear wheel 22 of the jack 2 are held against the bottom plate 12 by the front and rear fixing plates 121 of the bottom plate 12, so as to prevent of the jack 2 from moving. The handle 23 of the jack 2 can be temporarily detached from the jack and held by the fixing means 122 of the bottom plate 12. Thereby, the male sticky buckle 123 and female sticky buckle 124 of the fixing means 122 can be stuck together to encircle the jack handle 23. Therefore, the jack 2 and the jack handle 23 can be steadily and firmly secured within the receiving bag 1.

The present invention serves to improve the defects in the prior art paper receiving bag of a jack. The receiving bag 2 of the present invention can be made of plastic or cloth. As a result, the lifetime of the receiving bag 1 is longer than the prior art paper bag or box. Moreover, since two sides of the receiving bag 2 are installed with respective handle portions 13 and 13'. As the jack 2 is moved or carried, by the handle portions, it can be held by hand or hung on the shoulder of the user. Furthermore, when the jack 2 is taken out for use, the receiving bag 1 of the present invention can be stored without occupied any space as the prior art paper box. Moreover, a tool bad 15 is installed outside the receiving bag 1 of the present invention and a layered bag 141 is installed within the receiving bag 1 of the present invention. Other hand tools can be stored within the tool bag 15 or the layered bag 141. In summary, the effect of the present invention is superior than the prior art paper box.

Figure 9:
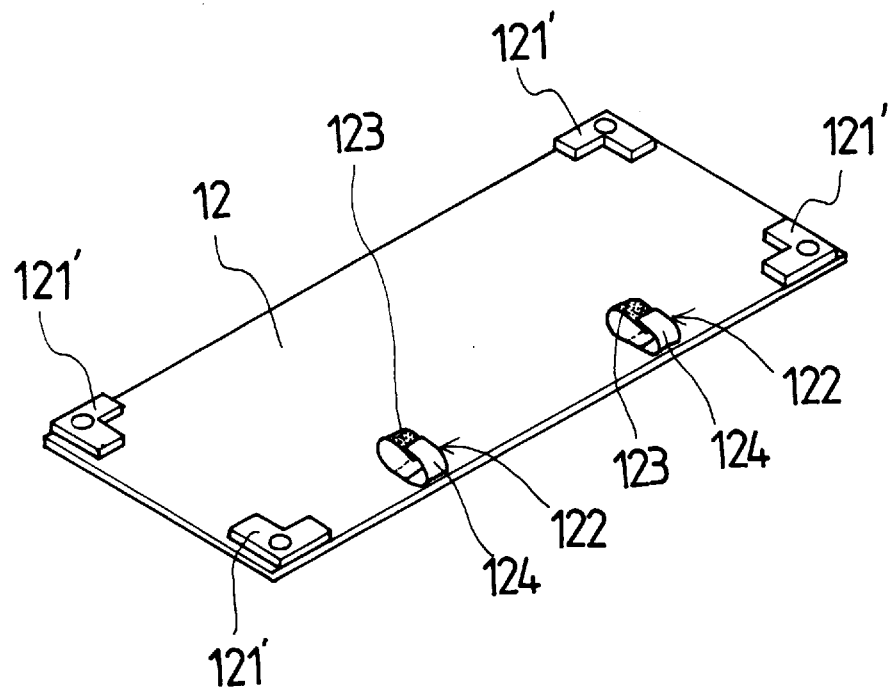
FIG. 9 is a schematic view showing another embodiment of the fixing plate according to the present invention.
Figure 8:
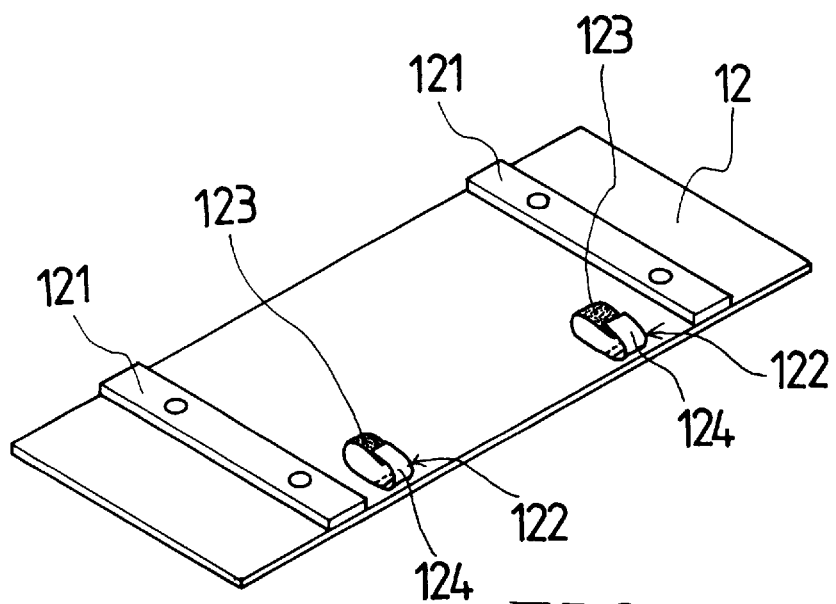
FIG. 8 is a schematic view showing another embodiment of the fixing plate according to the present invention.

Besides, the fixing plates 121 are not confined to be disposed at the front or rear edges of the bottom plate 12. As shown in FIG. 8, the fixing plates 121 can be firmly secured to be near the inner sides of the front and rear sides of the bottom plate 12 for abutting the inner side of the front wheel 21 and the rear wheel 22, so that the aforesaid jack 2 cannot slide. Moreover, as shown in FIG. 9, the fixing plates 121' are formed as an L shape. Four L shape fixing plates 121' can be firmly secured to the four corners of the bottom plate 12 for resisting movement of the front wheel 21 and the rear wheel 22 of the carjack 2.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A receiving bag for holding a car jack, the receiving bag comprising a bag made of one of plastic and cloth; the bag having front and rear ends, a top, a bottom and two sides extending between the front and rear ends of the bag; a zipper arranged in the top of the bag, the zipper extending between the front and rear ends of the bag, handle portions respectively arranged on the sides of the bag, and a bottom plate arranged on the bottom of the bag, the bottom plate having a rectangular shape and means for abutting and preventing movement of a car jack held in the bag.

2. A receiving bag for holding a car jack, the receiving bag comprising a bag made of one of plastic and cloth, the bag having front and rear ends; a top, a bottom and two sides extending between the front and rear ends of the bag; a zipper arranged in the top of the bag, the zipper extending between the front and rear ends of the bag, handle portions respectively arranged on the sides of the bag, a bottom plate arranged on the bottom of the bag, the bottom plate having a rectangular shape with a top and front and rear ends, and a transversally long fixing plate arranged on the top and front and rear ends of the bottom plate.

3. The receiving bag for holding a car jack according to claim 1, wherein the bottom plate has a top, and one or more fixing means for holding a jack handle are arranged on the top of the bottom plate.

4. The receiving bag for holding a car jack according to claim 3, wherein the fixing means include a male sticky buckle and a female sticky buckle, one end of the male sticky buckle and one end of the female sticky buckle are overlapped and secured to the top of the bottom plate, while another end of the male sticky buckle and the female sticky are attachable or detachable.

5. The receiving bag for holding a car jack according to claim 1, wherein one side of the two sides of the bag is provided with a zippered opening, the zippered open communicating with a layered bag extending into the bag.

6. The receiving bag for holding a car jack according to claim 1, wherein an outer side of one of the two sides of the bag has a top with a zippered opening and protrudes outwardly with an approximately rectangular shape.

7. The receiving bag for holding a car jack according to claim 1, wherein a pad with an opening facing to one of the handle portions is provided at middle of another of the handle portions, the pad having a sticky buckle for combining the two handle portions.

8. The receiving bag for holding a car jack according to claim 1, wherein the bottom plate has front and rear ends, and the means includes fixing plates arranged on the bottom plate inside the front and rear ends of the bottom plate for resisting against a front wheel and a rear wheel of a car jack held in the bag.

9. A receiving bag for holding a car jack, the receiving bag comprising a bag made of one of plastic and cloth; the bag having front and rear ends, a top, a bottom and two sides extending between the front and rear ends of the bag; a zipper arranged in the top of the bag, the zipper extending between the front and rear ends of the bag, handle portions respectively arranged on the sides of the bag, and a bottom plate arranged on the bottom of the bag, the bottom plate having a rectangular shape and four L-shaped fixing plates respectively secured to four corners of the bottom plate for resisting against a front wheel and a rear wheel of a car jack.

* * * * *